United States Patent
Havens et al.

(10) Patent No.: US 12,359,016 B2
(45) Date of Patent: Jul. 15, 2025

(54) METHOD OF PREPARING LOW HAZE POLYMER COMPOSITIONS FOR USE IN HIGH REFRACTIVE INDEX OPTICAL MATERIALS

(71) Applicant: PPG Industries Ohio, Inc., Cleveland, OH (US)

(72) Inventors: Barry R. Havens, Pensacola, FL (US); Darrin R. Dabideen, Pittsburgh, PA (US); Matthew S. Luchansky, Wexford, PA (US); Nigel D. Kidder-Wolff, Somerville, MA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 384 days.

(21) Appl. No.: 17/907,608

(22) PCT Filed: Mar. 24, 2021

(86) PCT No.: PCT/US2021/023900
§ 371 (c)(1),
(2) Date: Sep. 28, 2022

(87) PCT Pub. No.: WO2021/202197
PCT Pub. Date: Oct. 7, 2021

(65) Prior Publication Data
US 2023/0147118 A1    May 11, 2023

Related U.S. Application Data

(60) Provisional application No. 63/001,643, filed on Mar. 30, 2020.

(51) Int. Cl.
| | | |
|---|---|---|
| C08G 18/76 | (2006.01) |
| B29D 11/00 | (2006.01) |
| B29K 75/00 | (2006.01) |
| B29K 105/00 | (2006.01) |
| C08G 18/24 | (2006.01) |
| C08G 18/38 | (2006.01) |
| G02B 1/04 | (2006.01) |
| G02C 7/02 | (2006.01) |

(52) U.S. Cl.
CPC ....... *C08G 18/7642* (2013.01); *C08G 18/242* (2013.01); *C08G 18/3868* (2013.01); *C08G 18/3876* (2013.01); *G02B 1/041* (2013.01); *G02C 7/022* (2013.01); *B29D 11/00009* (2013.01); *B29K 2075/00* (2013.01); *B29K 2105/0014* (2013.01)

(58) Field of Classification Search
CPC .............. C08G 18/7642; C08G 18/242; C08G 18/3876; C08G 18/3868; B29D 11/00009; B29K 2075/00; B29K 2105/0014; G02B 1/041; G02C 7/022
See application file for complete search history.

(56) References Cited

U.S. PATENT DOCUMENTS

| | | | |
|---|---|---|---|
| 5,837,797 | A | 11/1998 | Okazaki et al. |
| 9,777,103 | B2 | 10/2017 | Kawaguchi et al. |
| 2016/0145201 | A1 | 5/2016 | Kojima et al. |
| 2017/0210702 | A1 | 7/2017 | Halpaap et al. |

FOREIGN PATENT DOCUMENTS

| | | |
|---|---|---|
| EP | 2008998 B1 | 6/2013 |
| EP | 2075271 B1 | 12/2014 |
| EP | 3315489 A1 | 5/2018 |
| JP | 2014234430 A | 12/2014 |
| WO | 2015155365 A2 | 10/2015 |

OTHER PUBLICATIONS

Mayer et al., "Photosensitive Chiral Polyisocyanates", Macromolecular Symposia, Wiley VCH Verlag Weinheim, DE, vol. 137, Jan. 1, 1999, p. 67-73, XP000847430.
International Search Report and Written Opinion received for PCT Application Serial No. PCT/US2021/023900 dated Jul. 2, 2021, 8 pages.

*Primary Examiner* — Rabon A Sergent
(74) *Attorney, Agent, or Firm* — Robert J. Toth

(57) ABSTRACT

A method of preparing a low bubbling and low yellowing, high refractive index polyurethane or polythiourethane is provided. A method of evaluating an aromatic polyiso(thio) cyanate material, such as an aromatic diisocyanate, e.g., m-xylene cyanate, is provided. The method evaluates transmittance in a sample of the isocyanate to determine if the aromatic polyiso(thio)cyanate material will lead to unacceptable bubbling or yellowing in a high refractive index or high Abbe number polymer composition.

21 Claims, 2 Drawing Sheets

METHOD OF PREPARING LOW HAZE POLYMER COMPOSITIONS FOR USE IN HIGH REFRACTIVE INDEX OPTICAL MATERIALS

CROSS-REFERENCE TO RELATED APPLICATION

This application is the United States national phase of International Patent Application No. PCT/US2021/023900 filed Mar. 24, 2021, which claims priority to U.S. Provisional Application No. 63/001,643, filed Mar. 30, 2020, the disclosures of which are incorporated by reference herein in their entireties.

BACKGROUND

A method of preparing polyurethanes and polythiourethanes is provided along with polyurethane and polythiourethane compositions and a method of evaluating the quality of isocyanate monomers for use in manufacture of high refractive index optics.

Isocyanates, such as aromatic polyisocyanates (e.g., m-xylylene diisocyanate (mXDI)) or polyisothiocyanates (collectively, "polyiso(thio)cyanates"), may be used in the manufacture of high refractive index optics, such as lenses. For example and without limitation, isocyanates, such as diisocyanates, can be polymerized with diols or polyols to produce polyurethanes, and di- or poly-thiols to produce polythiourethanes (poly(thio)urethanes—referring collectively to both polyurethanes and polythiourethanes). Certain isocyanates, such as m-xylylene diisocyanates, are very labile and sensitive to very small amounts of water, resulting in polymer products with unacceptable properties, such as bubbles, haze, and yellowing.

Optical articles, such as lenses, are analyzed post-polymerization as a part of a quality-control process, where bubbles, haze, and yellowing can be determined by visual inspection, or absorbance at a specific wavelength, but this process is wasteful in terms of manufacturing time and expense, and can lead to significant delays in bringing a product to market.

A method of determining if an isocyanate, such as a polyiso(thio)cyanate or an aromatic diisocyanate, with an example being m-xylylene diisocyanate, will produce bubbling or discoloration, e.g., yellowing, in a final lens product is desirable.

SUMMARY

According to one aspect of the disclosure, a method of preparing a polymer composition is provided. The method comprises polymerizing a polymerizable composition comprising a mixture of an aromatic polyiso(thio)cyanate material and at least one polyol or a polythiol, wherein percent transmittance (% T) of the aromatic polyiso(thio)cyanate material used to prepare the polymerizable composition is measured at a wavelength of 310 nm±2 nm, and the aromatic polyiso(thio)cyanate material added to the mixture has at least 35 percent transmittance (% T) at a wavelength of 310 nm in a quartz cuvette with an optical path of one centimeter, calibrated to water having a unit % T of 100%.

In another aspect, a polymerizable composition is provided for use in preparing a polymer composition. The polymerizable composition comprises a mixture of an aromatic polyiso(thio)cyanate composition and a polyol or a polythiol compound, wherein the transmittance of the polyiso(thio)cyanate composition used to prepare the mixture is determined at a wavelength of 310 nm±2 nm, and the aromatic polyiso(thio)cyanate composition added to the polymerizable composition has at least 35 percent transmittance (% T), at a wavelength of 310 nm in a quartz cuvette with an optical path of one centimeter, calibrated to water having a unit % T of 100%.

In yet another aspect, a method is provided of identifying a batch of an aromatic polyiso(thio)cyanate material that produces a low bubble and/or low Yellowness Index (ASTM Method E313), high refractive index optical article when polymerized in a polymerizable composition with a polyol or a polythiol. The method comprises illuminating a liquid sample of the batch of the aromatic polyiso(thio)cyanate material with a light source producing light at 310 nm±2 nm; obtaining transmittance or absorbance values of the light passing through the aromatic polyiso(thio)cyanate material; and determining from the transmittance or absorbance values if the aromatic polyiso(thio)cyanate material has at least 35 percent transmittance (% T) at a wavelength of 310 nm in a quartz cuvette with an optical path of one centimeter, calibrated to water having a unit % T of 100%, wherein when the aromatic polyiso(thio)cyanate material has at least 35 percent transmittance (% T) at a wavelength of 310 nm in a quartz cuvette with an optical path of one centimeter, calibrated to water having a unit % T of 100%, it produces a low bubbling and/or low Yellowness Index, high refractive index optical article when polymerized in a polymerizable composition with a polyol or a polythiol.

In a further aspect, a method of manufacturing a molded article is provided, comprising preparing a polymerizable composition; introducing the polymerizable composition into a mold; and curing, at least partially, the polymerizable composition within the mold. The polymerizable composition comprises a mixture of an aromatic polyiso(thio)cyanate composition and a polyol or a polythiol compound, wherein the transmittance of the polyiso(thio)cyanate composition used to prepare the mixture is determined at a wavelength of 310 nm±2 nm, and the aromatic polyiso(thio)cyanate composition added to the polymerizable composition has at least 35 percent transmittance (% T), at a wavelength of 310 nm in a quartz cuvette with an optical path of one centimeter, calibrated to water having a unit % T of 100%.

Further aspects are provided, as follows.

According to a first aspect, a method of preparing a polymer composition is provided, comprising polymerizing a polymerizable composition comprising a mixture of an aromatic polyiso(thio)cyanate material and at least one polyol or a polythiol, wherein percent transmittance (% T) of the aromatic polyiso(thio)cyanate material used to prepare the polymerizable composition is measured at a wavelength of 310 nm±2 nm, and the aromatic polyiso(thio)cyanate material added to the mixture has at least 35 percent transmittance (% T) at a wavelength of 310 nm in a quartz cuvette with an optical path of one centimeter, calibrated to water having a unit % T of 100%.

According to a second aspect, a method of preparing a polymer composition is provided according to the first aspect, wherein the aromatic polyiso(thio)cyanate is an aromatic diisocyanate.

According to a third aspect, a method of preparing a polymer composition is provided according to the second aspect, wherein the aromatic polyiso(thio)cyanate is m-xylylene diisocyanate.

According to a fourth aspect, a method of preparing a polymer composition is provided according to any one of the first aspect through the third aspect, wherein the polyol or polythiol is selected from 4-mercaptomethyl-3,6-dithia-1,8-octanedithiol, 1,5-di mercapto-3-thiapentane, 2,3-bis((2-((2-mercaptoethyl)thio)ethyl)thio)propan-1-ol, 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, or mixtures of two or more thereof.

According to a fifth aspect, a method of preparing a polymer composition is provided according to any one of the first aspect through the fourth aspect, further comprising prior to polymerizing the polymerizable composition, injecting the polymerizable composition into a mold to form an optical article.

According to a sixth aspect, a method of preparing a polymer composition is provided according to the fifth aspect, wherein the optical article is an ophthalmic article.

According to a seventh aspect, a method of preparing a polymer composition is provided according to the sixth aspect, wherein the ophthalmic article is a lens.

According to an eighth aspect, a method of preparing a polymer composition is provided according to the sixth aspect, wherein the ophthalmic article is an eyeglass lens.

According to a ninth aspect, a method of preparing a polymer composition is provided according to any one of the first aspect through the eighth aspect, further comprising, prior to polymerizing the polymerizable composition, determining the percent transmittance of one or more batches of the polyiso(thio)cyanate material at 310 nm±2 nm; selecting a batch of the aromatic polyiso(thio)cyanate material having at least 35 percent transmittance (% T) at a wavelength of 310 nm in a quartz cuvette with an optical path of one centimeter, calibrated to water having a unit % T of 100%; and combining aromatic polyiso(thio)cyanate material from the selected batch with the polythiol to produce the polymerizable composition.

According to a tenth aspect, a method of preparing a polymer composition is provided according to the ninth aspect, wherein determining the percent transmittance of one or more batches of the polyiso(thio)cyanate material is performed by illuminating a liquid sample of a batch of the aromatic polyiso(thio)cyanate material with a light source including light at a wavelength of 310 nm±2 nm; and measuring % T at 310 nm±2 nm.

According to an eleventh aspect, a method of preparing a polymer composition is provided according to any one of the first aspect through the tenth aspect, wherein the aromatic polyiso(thio)cyanate material has at least 40 percent transmittance (% T) at a wavelength of 310 nm in a quartz cuvette with an optical path of one centimeter, calibrated to water having a unit % T of 100%.

According to a twelfth aspect, a method of preparing a polymer composition is provided according to any one of the first aspect through the tenth aspect, wherein the aromatic polyiso(thio)cyanate material has at least 50 percent transmittance (% T) at a wavelength of 310 nm in a quartz cuvette with an optical path of one centimeter, calibrated to water having a unit % T of 100%.

According to a thirteenth aspect, a method of preparing a polymer composition is provided according to any one of the first aspect through the twelfth aspect, wherein the aromatic polyiso(thio)cyanate material has at least 60 percent transmittance (% T) at a wavelength of 320 nm in a quartz cuvette with an optical path of one centimeter, calibrated to water having a unit % T of 100%, and measured at a wavelength of 320 nm±2 nm.

According to a fourteenth aspect, a polymerizable composition is provided for use in preparing a polymer composition comprising a mixture of an aromatic polyiso(thio)cyanate composition and a polyol or a polythiol compound, wherein the transmittance of the polyiso(thio)cyanate composition used to prepare the mixture is determined at a wavelength of 310 nm±2 nm, and the aromatic polyiso(thio)cyanate composition added to the polymerizable composition has at least 35 percent transmittance (% T), at a wavelength of 310 nm in a quartz cuvette with an optical path of one centimeter, calibrated to water having a unit % T of 100%.

According to a fifteenth aspect, a polymerizable composition is provided according to the fourteenth aspect, wherein the aromatic polyiso(thio)cyanate is an aromatic diisocyanate.

According to a sixteenth aspect, a polymerizable composition is provided according to the fourteenth aspect, wherein the aromatic polyiso(thio)cyanate is m-xylylene diisocyanate.

According to a seventeenth aspect, a polymerizable composition is provided according to any one of the fourteenth aspect through the sixteenth aspect, wherein the polyol or polythiol is 4-mercaptomethyl-3,6-dithia-1,8-octanedithiol; 1,5-di mercapto-3-thiapentane; 2,3-bis((2-((2-mercaptoethyl)thio)ethyl)thio)propan-1-ol; or a mixture of 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane.

According to an eighteenth aspect, a polymerizable composition is provided according to any one of the fourteenth aspect through the seventeenth aspect, wherein the polyiso(thio)cyanate added to the polymerizable composition has at least 40 percent transmittance (% T) at a wavelength of 310 nm in a quartz cuvette with an optical path of one centimeter, calibrated to water having a unit % T of 100%.

According to a nineteenth aspect, a polymerizable composition is provided according to any one of the fourteenth aspect through the seventeenth aspect, wherein the polyiso(thio)cyanate added to the polymerizable composition has at least 50 percent transmittance (% T) at a wavelength of 310 nm in a quartz cuvette with an optical path of one centimeter, calibrated to water having a unit % T of 100%.

According to a twentieth aspect, a polymerizable composition is provided according to any one of the fourteenth aspect through the nineteenth aspect, wherein the polyiso(thio)cyanate added to the polymerizable composition has at least 60 percent transmittance (% T) at a wavelength of 320 nm in a quartz cuvette with an optical path of one centimeter, calibrated to water having a unit % T of 100%.

According to a twenty-first aspect, a polymerizable composition is provided according to any one of the fourteenth aspect through the twentieth aspect, wherein determining the percent transmittance of one or more batches of the aromatic polyiso(thio)cyanate material is performed by illuminating a liquid sample of a batch of the aromatic iso(thio)cyanate material with a light source including light at a wavelength of 310 nm±2 nm; and measuring % T at 310 nm±2 nm.

According to a twenty-second aspect, a method is provided of identifying a batch of an aromatic polyiso(thio)cyanate material that produces a low bubble and/or low Yellowness Index (ASTM Method E313), high refractive index optical article when polymerized in a polymerizable composition with a polyol or a polythiol, comprising illuminating a liquid sample of the batch of the aromatic polyiso(thio)cyanate material with a light source producing light at 310 nm±2 nm; obtaining transmittance or absorbance values of the light passing through the aromatic polyiso(thio)cyanate material; and determining from the transmittance or absorbance values if the aromatic iso(thio)cyanate material has at least 35 percent transmittance (% T) at a wavelength of 310 nm in a quartz cuvette with an optical path of one centimeter, calibrated to water having a unit % T of 100%, wherein when the aromatic polyiso(thio)cyanate material has at least 35 percent transmittance (% T) at a wavelength of 310 nm in a quartz cuvette with an optical path of one centimeter, calibrated to water having a unit % T of 100%, it produces a low bubbling and/or low Yellowness Index, high refractive index optical article when polymerized in a polymerizable composition with a polyol or a polythiol.

According to a twenty-third aspect, a method of identifying a batch of an aromatic polyiso(thio)cyanate material that produces a low bubble and/or low Yellowness Index (ASTM Method E313), high refractive index optical article when polymerized in a polymerizable composition with a polyol or a polythiol is provided according to the twenty-second aspect, further comprising classifying the batch of the aromatic polyiso(thio)cyanate material according to its ability to produce acceptable or unacceptable bubbling and/or low Yellowness Index in a high refractive index optical article prepared from a copolymer produced by copolymerization of the aromatic polyiso(thio)cyanate material with a polyol or a polythiol, wherein the batch of the aromatic polyiso(thio)cyanate material produces acceptably low bubbling and/or low Yellowness Index when the aromatic polyiso(thio)cyanate material composition has at least 35 percent transmittance (% T) at a wavelength of 310 nm in a quartz cuvette with an optical path of one centimeter, calibrated to water having a unit % T of 100%.

According to a twenty-fourth aspect, a method of identifying a batch of an aromatic polyiso(thio)cyanate material that produces a low bubble and/or low Yellowness Index (ASTM Method E313), high refractive index optical article when polymerized in a polymerizable composition with a polyol or a polythiol is provided according to the twenty-second or twenty-third aspect, wherein the batch of the aromatic polyiso(thio)cyanate compound produces acceptably low bubbling and/or Yellowness Index when the aromatic polyiso(thio)cyanate material composition also has 60 percent transmittance (% T) at a wavelength of 320 nm in a quartz cuvette with an optical path of one centimeter, calibrated to water having a unit % T of 100%.

According to a twenty-fifth aspect, a method of identifying a batch of an aromatic polyiso(thio)cyanate material that produces a low bubble and/or low Yellowness Index (ASTM Method E313), high refractive index optical article when polymerized in a polymerizable composition with a polyol or a polythiol is provided according to the twenty-second through twenty-fourth aspect, wherein the optical article is a lens.

According to a twenty-sixth aspect, a method of identifying a batch of an aromatic polyiso(thio)cyanate material that produces a low bubble and/or low Yellowness Index (ASTM Method E313), high refractive index optical article when polymerized in a polymerizable composition with a polyol or a polythiol is provided according to the twenty-second through twenty-fifth aspect, wherein the polyiso(thio)cyanate is m-xylylene diisocyanate.

According to a twenty-seventh aspect, a method of identifying a batch of an aromatic polyiso(thio)cyanate material that produces a low bubble and/or low Yellowness Index (ASTM Method E313), high refractive index optical article when polymerized in a polymerizable composition with a polyol or a polythiol is provided according to the twenty-second through twenty-sixth aspect, wherein the polyol or polythiol is 4-mercaptomethyl-3,6-dithia-1,8-octanedithiol; 1,5-dimercapto thiapentane; 2,3-bis((2-((2-mercaptoethyl)thio)ethyl)thio)propan-1-ol; or a mixture of 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane.

According to a twenty-eighth aspect, a method of manufacturing a molded article is provided, comprising preparing a polymerizable composition according to any one of the fourteenth through the twenty-first aspects; introducing the polymerizable composition into a mold; and curing, at least partially, the polymerizable composition within the mold.

DETAILED DESCRIPTION

Figure 1:
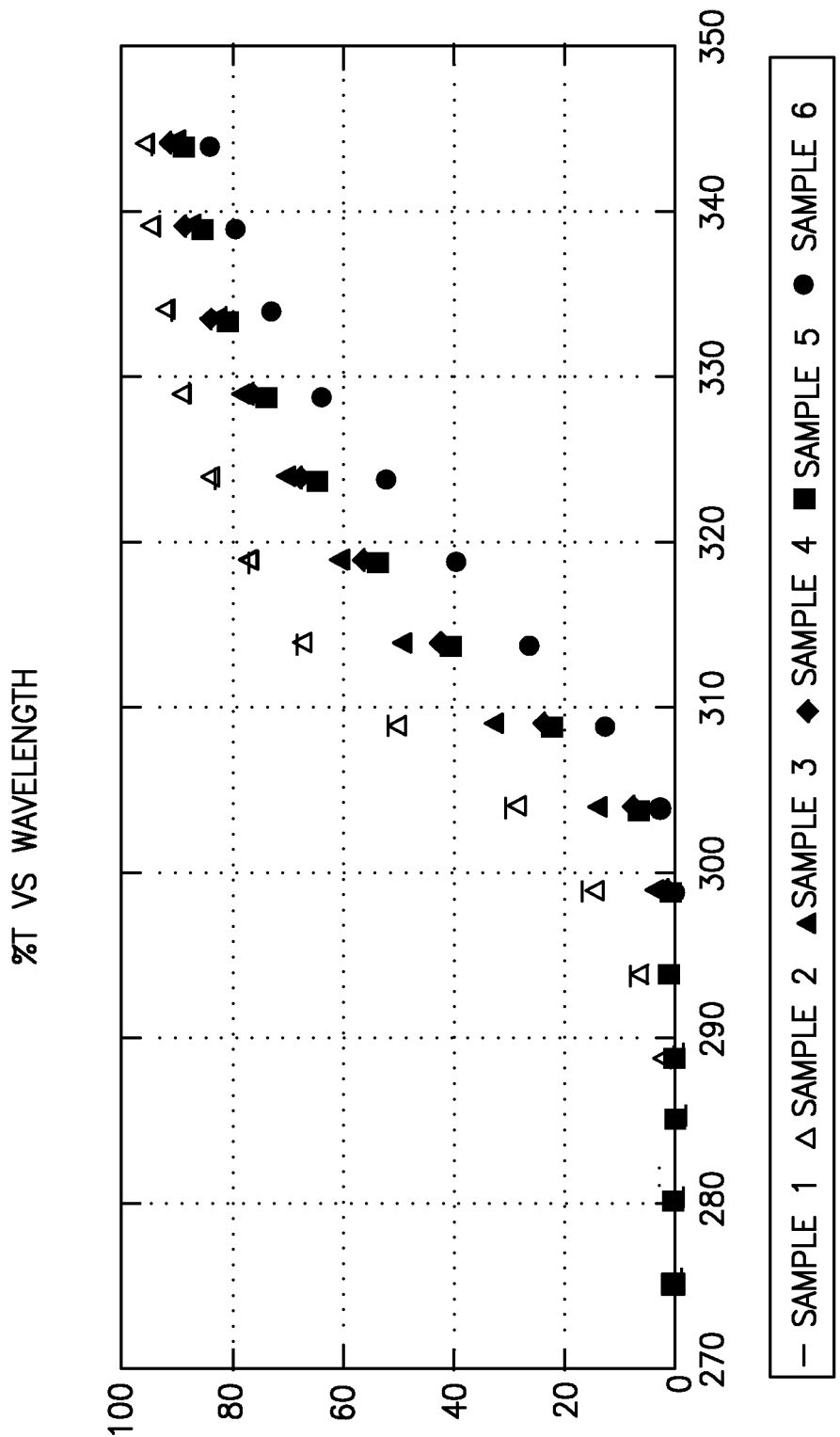
FIG. 1: Graph depicting UV-Visible % Transmittance vs. wavelength for mXDI samples as described in the Example.

As used herein, the articles "a", "an", and "the" include plural referents unless otherwise expressly and unequivocally limited to one referent.

Unless otherwise indicated, all ranges or ratios disclosed herein are to be understood to encompass any and all subranges or sub-ratios subsumed therein. For example, a stated range or ratio of "1 to 10" should be considered to include any and all subranges between (and inclusive of) the minimum value of 1 and the maximum value of 10; that is, all subranges or sub-ratios beginning with a minimum value of 1 or more and ending with a maximum value of 10 or less, such as but not limited to 1 to 6.1, 3.5 to 7.8, and 5.5 to 10.

Other than in the operating examples, or where otherwise indicated, all numbers expressing quantities of ingredients, reaction conditions, and so forth used in the specification and claims are to be understood as modified in all instances by the term "about".

The methods provided herein use a measure of transmittance to analyze a sample of an aromatic polyiso(thio)cyanate composition to predict the presence of bubbles or yellowing in an optical article, such as a lens, produced from a copolymer produced by polymerization of the aromatic polyiso(thio)cyanate, such as mXDI, with a suitable polythiol or polyol, such as a di-thiol or diol. Aromatic polyiso(thio)cyanates such as mXDI may be highly sensitive to water and impurities that lead to the formation of bubbles or yellowing in an optical article prepared from a polymerizate resulting from the polymerization reaction of the aromatic polyiso(thio)cyanate with a suitable polythiol or polyol. Impurities in an aromatic polyiso(thio)cyanate composition such as a mXDI composition may include phenol, dichlorobenzene, bis(chloromethyl)benzene, and/or chloro-xylylene isocyanate, among other impurities, such as degradation products, depending on the iso(thio)cyanate monomer compound. The term "polyiso(thio)cyanate", in reference to compounds or compositions, refers collectively to both polyisocyanate compounds or compositions and polyisothiocyanate compounds or compositions.

In aspects, a method of preparing a polymer composition is provided. A polymer composition is prepared from precursors, such as monomers and macromers. Any suitable reaction conditions, catalysts, cofactors, or crosslinkers may be utilized to conduct the polymerization reaction used to make a polymer composition. In the polymerization method presented herein, the aromatic polyiso(thio)cyanate material is analyzed prior to conducting the polymerization reaction, and typically prior to adding the aromatic polyiso(thio) cyanate material to the polymerization reaction mixture (polymerizable composition) to determine if the batch of the aromatic polyiso(thio)cyanate material to be used in the polymerization reaction mixture is of sufficient quality to prevent yellowing and/or bubble formation in the polymerizate (reaction product of the polymerization reaction). By "batch", it is meant any volume of a composition, and refers to a complete lot of a composition, for example as received, or any portion thereof.

The transmittance of a batch may be tested once, or multiple times, for example immediately on manufacture, shipping, at regular intervals, or immediately prior to use. Any suitable spectrophotometric method may be used to determine percent transmittance. Likewise, properties related to percent transmittance, such as absorbance values may be converted to percent transmittance to determine whether a sample meets the requirements of, for example, at least 35 percent transmittance (% T), measured at a wavelength of 310 nm with an optical path of one centimeter through a quartz cuvette calibrated to water having a unit % T of 100%. For example and without limitation, the Beer-Lambert law and appropriate equations may be used to interconvert transmittance and absorbance values.

As measure of the quality of the batch of aromatic polyiso(thio)cyanate material, the batch has a transmittance of at least 35 percent transmittance (% T), at least 40% T, or at least 50% T, at a wavelength of 310 nm, in a quartz cuvette with an optical path of one centimeter, calibrated to water having a unit % T of 100%. The as-measured aromatic polyiso(thio)cyanate material may be "neat" excluding additional solvents. Alternately, the material may include solvents, and/or other ingredients, so long as those other ingredients do not interfere with the ability to determine the quality of the aromatic polyiso(thio)cyanate material, as described herein.

The transmittance may be measured at 310 nm in a quartz cuvette with an optical path of one centimeter, calibrated to water having a unit % T of 100%. Alternatively, the transmittance may be measured at any suitable wavelength, e.g., 310 nm±2 nm, and in any suitable cuvette or spectrophotometric system, with any suitable calibration standard or calibration method to yield an equivalent of a measurement at a wavelength of 310 nm, in a quartz cuvette with an optical path of one centimeter, calibrated to water having a unit % T of 100%.

In addition to, or as an alternative to measuring transmittance at 310 nm±2 nm, the transmittance of the batch of aromatic polyiso(thio)cyanate composition also may be measured at a second wavelength, such as 320 nm±2 nm. For use in a polymerization reaction, the batch may have a transmittance of at least 60 percent transmittance (% T) at a wavelength of 320 nm, in a quartz cuvette with an optical path of one centimeter, calibrated to water having a unit % T of 100%. As with the measurement of the transmittance at 310 nm, any suitable measurement method may be used to determine if the batch meets the requirements of having a transmittance of at least 60 percent transmittance (% T) at a wavelength of 320 nm, in a quartz cuvette with an optical path of one centimeter, calibrated to water having a unit % T of 100%.

In the methods and compositions provided herein, the polymerizable composition includes an aromatic polyiso(thio)cyanate material that has been tested and verified, confirmed, or certified, at least once after manufacture and prior to polymerization, to meet the stated transmittance requirement. This verification, confirmation, or certification may be made at any time prior to use of the composition in a polymerization reaction.

In aspects, a method of identifying a batch of an aromatic polyiso(thio)cyanate material that produces a low haze, bubble-free, and/or low Yellowness Index (e.g., ASTM Method E313), high refractive index optical article when polymerized in a polymerizable composition with a polyol or a polythiol also is provided herein. The method may comprise illuminating a liquid sample of the batch of the aromatic polyiso(thio)cyanate material (e.g., aromatic polyiso(thio)cyanate monomer composition) with a light source producing light at 310 nm±2 nm. Next, transmittance or absorbance value(s) of the light passing through the aromatic polyiso(thio)cyanate material may be obtained. From the transmittance or absorbance values, it may be determined if the iso(thio)cyanate material has at least 35 percent transmittance (% T) at a wavelength of 310 nm in a quartz cuvette with an optical path of one centimeter, calibrated to water having a unit % T of 100%. When the aromatic polyiso(thio)cyanate material has at least 35 percent transmittance (% T) at a wavelength of 310 nm in a quartz cuvette with an optical path of one centimeter, calibrated to water having a unit % T of 100%, the aromatic polyiso(thio) cyanate material may produce a low Yellowness Index, high refractive index optical article with few bubbles when polymerized in a polymerizable composition with a polyol or a polythiol.

As used herein, the term "isocyanate", and related terms, refers to a compound that includes at least one isocyanate group (—NCO). A "polyisocyanate" includes at least two isocyanate (—NCO) groups. An "aromatic isocyanate" refers to isocyanates comprising an aromatic group where at least one isocyanate (—NCO) group is attached to the aromatic group directly, or indirectly, such as through one or more methylene groups. An "aromatic diisocyanate" refers to isocyanates, such as mXDI, comprising two isocyanate (—NCO) groups and an aromatic group, and an "aromatic polyisocyanate" refers to isocyanates, such as mXDI, comprising at least two isocyanate (—NCO) groups and an aromatic group.

As used herein, the term "isothiocyanate" and related terms refers to a compound that includes at least one isothiocyanate group (—NCS). A "polyisothiocyanate" includes at least two isothiocyanate (—NCS) groups. An "aromatic isothiocyanate" refers to isothiocyanates comprising an aromatic group where at least one isothiocyanate (—NCS) group is attached to the aromatic group directly, or indirectly, such as through one or more methylene groups. An "aromatic diisothiocyanate" refers to isothiocyanates comprising two isothiocyanate (—NCS) groups and an aromatic group, and an "aromatic polyisothiocyanate" refers to isothiocyanates comprising at least two isothiocyanate (—NCS) groups and an aromatic group.

Classes of aromatic polyiso(thio)cyanates that may be evaluated by or employed in the methods of the present invention include, but are not limited to, aromatic polyiso(thio)cyanate compounds; aromatic polyiso(thio)cyanate compounds that include one or more thioether linkages; aromatic polyiso(thio)cyanate compounds that include one or more disulfide linkages; and aromatic polyiso(thio)cyanate compounds that include both at least one isothiocyanate group and at least one isocyanate group.

Examples of aromatic polyisocyanate compounds from which the aromatic polyiso(thio)cyanate compound may be selected include, but are not limited to, 1,2-diisocyanatobenzene, 1,3-diisocyanatobenzene, 1,4-diisocyanatobenzene, tolylene diisocyanate, 2,4-diisocyanatotoluene, 2,6-diisocyanatotoluene, ethylphenylene diisocyanate, isopropylphenylene diisocyanate, dimethylphenylene diisocyanate, diethylphenylene diisocyanate, diisopropylphenylene diisocyanate, trimethylbenzene triisocyanate, benzene triisocyanate, biphenyl diisocyanate, toluidine diisocyanate, 4,4'-methylenebis(phenyl isocyanate), 4,4'-methylenebis(2-methylphenyl isocyanate), bibenzyl-4,4'-diisocyanate, bis(isocyanatophenyl)ethylene, bis(isocyanatemethyl)benzene, xylylene diisocyanate, bis(isocyanatoethyl)benzene, bis(isocyanatopropyl)benzene, α,α,α',α'-tetramethylxylylene diisocyanate, bis(isocyanatobutyl)benzene, bis(isocyanatomethyl)naphthalene, bis(isocyanatomethylphenyl)ether, bis(isocyanatoethyl)phthalate, 2,5-di(isocyanatomethyl)furan, and combinations of two or more thereof.

A non-limiting example of an aromatic polyisocyanate compound from which the aromatic polyiso(thio)cyanate compound may be selected, is m-xylylene diisocyanate (mXDI).

Examples of aromatic polyisothiocyanate compounds, from which the aromatic polyiso(thio)cyanate compound can be selected include, but are not limited to, 1,2-diisothiocyanato benzene, 1,3-diisothiocyanato benzene, 1,4-diisothiocyanato benzene, 2,4-diisothiocyanato toluene, 2,5-diisothiocyanato-m-xylene, 4,4'-methylenebis(phenyl isothiocyanate), 4,4'-methylenebis(2-methylphenyl isothiocyanate), 4,4-methylenebis(3-methylphenyl isothiocyanate), 4,4'-diisothiocyanato benzophenone, 4,4'-diisothiocyanato-3,3'-dimethyl benzophenone, or bis(4-isothiocyanatophenyl) ether, and combinations of two or more thereof.

Examples of aromatic polyisocyanate compounds that include one or more sulfide linkages, from which the aromatic polyiso(thio)cyanate compound may be selected include, but are not limited to, 2-isocyanatophenyl-4-isocyanatophenyl sulfide, bis(4-isocyanatophenyl)sulfide, bis(4-isocyanatomethylphenyl)sulfide, and combinations thereof.

Examples of aromatic polyisocyanate compounds that include one or more disulfide linkages, from which the aromatic polyiso(thio)cyanate compound may be selected include, but are not limited to, bis(4-isocyanatophenyl)disulfide, bis(2-methyl-5-isocyanatophenyl)disulfide, bis(3-methyl-5-isocyanatophenyl)disulfide, bis(3-methyl-6-isocyanatophenyl)disulfide, bis(4-methyl-5-isocyanatophenyl)disulfide, bis(4-methoxy-3-isocyanatophenyl)disulfide, and combinations of two or more thereof.

As used herein, recitations of "linear or branched" groups, such as linear or branched alkyl, are herein understood to include a methylene group or a methyl group; groups that are linear, such as linear $C_2$-$C_{10}$ alkyl groups; and groups that are appropriately branched, such as branched $C_3$-$C_{10}$ alkyl groups.

Suitable polyols or polythiols may be bonded with, or polymerized in a polymerizable composition with, the aromatic polyiso(thio)cyanate described herein to produce copolymers, such as polyurethane and polythiourethane polymers. Examples of suitable polyols include, but are not limited to, alkylene glycols, such as ethylene glycol, propylene glycol, diethylene glycol, dipropylene glycol, 1,2-propylene glycol, triethylene glycol, tripropylene glycol, hexylene glycol, polyethylene glycol, polypropylene glycol and neopentyl glycol; hydrogenated bisphenol A; cyclohexanediol; propanediols including 1,2-propanediol, 1,3-propanediol, butyl ethyl propanediol, 2-methyl-1,3-propanediol, and 2-ethyl-2-butyl-1,3-propanediol; butanediols including 1,4-butanediol, 1,3-butanediol, and 2-ethyl-1,4-butanediol; pentanediols including trimethyl pentanediol and 2-methylpentanediol; 2,2,4-trimethyl-1,3-pentanediol, cyclohexanedimethanol; hexanediols including 1,6-hexanediol; 2-ethyl-1,3-hexanediol, caprolactonediol (for example, the reaction product of epsilon-caprolactone and ethylene glycol); hydroxyalkylated bisphenols; polyether glycols, for example, poly(oxotetramethylene) glycol; trimethylol propane, di-trimethylol propane, pentaerythritol, di-pentaerythritol, trimethylol ethane, trimethylol butane, dimethylol cyclohexane, glycerol, tris(2-hydroxyethyl) isocyanurate, and the like.

Suitable polythiol compositions include a polythiol compound (A) that includes at least two thiol groups. With some embodiments, the polythiol compound (A) includes at least three thiol groups. With some further embodiments, the polythiol compound (A) includes from 2 to 10 thiol groups, or from 2 to 8 thiol groups, or from 2 to 6 thiol groups, or from 2 to 5 thiol groups, inclusive of the recited numbers. With some additional embodiments, the polythiol compound (A) includes 2, 3, 4, 5, or 6 thiol groups. The polythiol compound (A), with some embodiments, optionally includes at least one hydroxyl group, such as, but not limited to, 0, 1, 2, or 3 hydroxyl groups.

The polythiol compound (A) is, with some embodiments, represented by the following Formula (A-II),

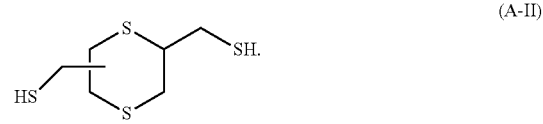

(A-II)

The polythiol compound (A) is, with some further embodiments, represented by the following Formula (A-III),

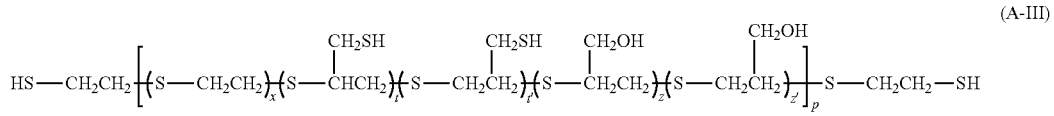

(A-III)

With reference to Formula (A-III): p is 0 to 4; and x, t, t', z, and z' are each independently 0 to 4 for each p. With some embodiments, and with further reference to Formula (A-III): p is 0 to 3; and x, t, t', z, and z' are each independently 0 to 3 for each p.

Examples of polythiols from which polythiol compound (A) can be selected include, but are not limited to, 1,2-ethanedithiol, 1,2-propanedithiol, 1,3-propanedithiol, 1,2,3-propanetrithiol, tetrakis(mercaptomethyl)methane, trimethylolpropane tris(2-mercaptoacetate), trimethylolpropane tris(3-mercaptopropionate), trimethylolethane tris(2-mercaptoacetate), trimethylolethane tris(3-mercaptopropionate), pentaerythritol tetrakis(2-mercaptoacetate), pentaerythritol tetrakis(3-mercaptopropionate), 1,2,3-tris(mercaptomethylthio)propane, 1,2,3-tris(2-mercaptoethylthio)propane, 1,2,3-tris(3-mercaptopropylthio)propane, 1,5-dimercapto-3-thiapentane, 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, 7-(mercaptomethyl)-3,6,9,12-tetrathiatetradecane-1,14-dithiol, tetrakis(mercaptomethylthiomethyl)methane, tetrakis(2-mercaptoethylthiomethyl)methane, tetrakis(3-mercaptopropylthiomethyl)methane, bis(2,3-dimercaptopropyl)sulfide, 1,1,3,3-tetrakis(mercaptomethylthio)propane, 1,1,2,2-tetrakis(mercaptomethylthio)ethane, 4,6-bis(mercaptomethylthio)-1,3-dithiacyclohexane, tris(mercaptomethylthio)methane, tris(mercaptoethylthio)methane, and combinations of two or more thereof.

Examples of polythiol compounds (A) that include a hydroxyl group include, but are not limited to, 2,3-dimercapto-1-propanol; 1,3-dimercaptopropan-2-ol; 2,3-bis((2-mercaptoethyl)thio)propan-1-ol; 1,3-bis((2-mercaptoethyl)thio)propan-2-ol; 3-mercapto-2-((2-mercaptoethyl)thio)propan-1-ol; 2-((2-mercaptoethyl)thio)-3-((2-((2-mercaptoethyl)thio)ethyl)thio)propan-1-ol; 2,3-bis((2-((2-mercaptoethyl)thio)ethyl)thio)propan-1-ol; glycerin bis(2-mercaptoacetate); glycerin bis(3-mercaptopropionate); 1,3-dimercapto-2-propanol; trimethylolpropane bis(2-mercaptoacetate); trimethylolpropane bis(3-mercaptopropionate); pentaerythritol bis(2-mercaptoacetate); pentaerythritol tris(2-mercaptoacetate); pentaerythritol bis(3-mercaptopropionate); and pentaerythritol tris(3-mercaptopropionate).

The polythiol compound (A) is, with some embodiments, selected from at least one of the following polythiol compounds represented by Formulas (A-3) through (A-8):

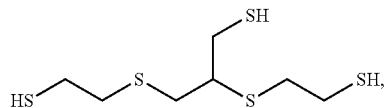
(A-3)

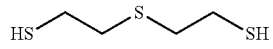
(A-4)

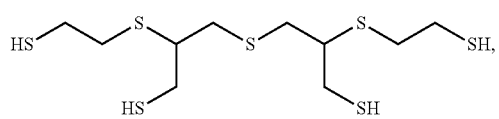
(A-5)

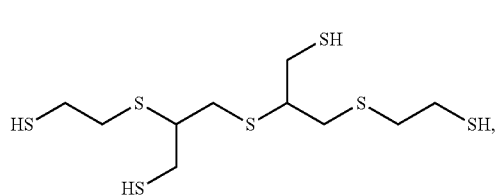
(A-6)

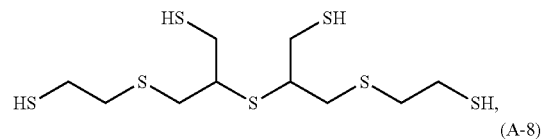
(A-7)

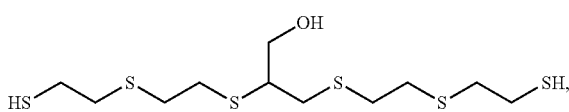
(A-8)

and combinations of two or more thereof.

Methods by which the polythiol compound (A) may be prepared can, with some embodiments, involve the use of acids and/or bases during isolation of the polythiol compound (A). As such, the polythiol compound (A) may, with some embodiments, have an acidic pH or a basic pH. For purposes of non-limiting illustration, if excess acid, such as HCl, is used, the isolated polythiol compound (A) can have an acidic pH. For purposes of further non-limiting illustration, if excess base, such as NaOH, is used, the resulting polythiol compound (A) can have a basic pH.

Also provided herein is a polymerizable composition that includes (i) an aromatic polyiso(thio)cyanate material as described herein above, and (ii) a polythiol or polyol composition, such as the polythiol compound (A). The aromatic polyiso(thio)cyanate material includes at least two iso(thio)cyanate groups. With some embodiments, the aromatic polyiso(thio)cyanate material includes 2 to 6, or 2 to 5, or 2 to 4, or 2 or 3 iso(thio)cyanate groups.

Also provided herein is a polymerizate of the polymerizable composition. The polymerizate is prepared by polymerizing (or curing) a polymerizable composition according to many aspect or embodiment described herein.

The polymerizable composition may be cured by any suitable method(s), so as to form a polymerizate. With some further embodiments, the polymerizable composition is cured at a temperature ranging from 25° C. to 90° C., such as ambient conditions, such as at room temperature of about 25° C. With some further embodiments, the polymerizable composition is cured by exposure to elevated temperature (in excess of ambient room temperature). As used herein, by "cured" is meant a three dimensional crosslink network is formed by covalent bond formation, such as between the thiol groups of the polythiol composition and the iso(thio)cyanate groups of the aromatic polyiso(thio)cyanate material. The temperature at which the polymerizable composition is cured is variable and depends in part on the amount of time during which curing is conducted. With some embodiments, the polymerizable composition is cured at an elevated temperature of from 90° C. to 204° C., or from 100° C. to 177° C., or from 110° C. to 140° C., for a period of 20 to 240 minutes.

In accordance with the present invention there is also provided an optical element that includes a polymerizate of the polymerizable composition. Classes of optical elements include, but are not limited to, ophthalmic articles, display articles, windows, mirrors, active liquid crystal cell articles, and passive liquid crystal cell articles.

Examples of ophthalmic articles include, but are not limited to, corrective lenses, non-corrective lenses, contact lenses, intra-ocular lenses, magnifying lenses, protective lenses, and visors. Examples of display article include, but are not limited to, screens, monitors, and security elements.

Also provided herein is a method of forming a molded article comprising mixing together an aromatic polyiso(thio)cyanate material as described herein meeting the described transmittance requirements and a polythiol or polyol composition, thereby forming a polymerizable composition. Optionally, the method includes introducing the polymerizable composition into a mold; and curing the polymerizable composition within said mold.

The aromatic polyiso(thio)cyanate compound and the polythiol or polyol composition may be mixed together using any appropriate mixing method(s). Examples of suitable mixing methods include, but are not limited to, batch mixing, such as in an appropriate vessel, such as a mixing tank including one or more impellers; continuous mixing, such as in a static mixer and/or an extruder; impingement mixing, such as within a mixing chamber of a mold injection head; and combinations of such mixing methods.

After being formed by mixing, the polymerizable composition may be introduced into a mold by any appropriate method(s). The polymerizable composition can be introduced into a mold by methods including, but not limited to, pouring, such as from a beaker or other vessel; and/or injection, such as from a mold injector head. With some embodiments, the mold is a multiple-piece mold, such as a two-piece mold that includes at least one injection port and optionally one or more gaskets.

After introduction into the mold, the polymerizable composition may be cured within the mold. The term "cured" is as defined previously herein. The polymerizable composition can be cured within the mold at room temperature, such as about 25° C.; elevated temperature, such as from 90° C. to 204° C., or from 100° C. to 177° C., or from 110° C. to 140° C., for a period of 20 to 240 minutes; or any combination thereof. With some embodiments, the polymerizable composition is substantially completely cured within the mold.

With some embodiments, after curing, the polymerizable composition within the mold, the resulting polymerizate is typically removed from the mold. The polymerizate can be subjected to one or more additional steps such as, but not limited to, grinding; surface cleaning; surface treatment, such as etching and/or plasma treatments; forming one or more layers over at least one surface of the polymerizate, such as, but not limited to, protective layers, tinted layers, and/or anti-reflective layers; and combinations thereof.

In the examples presented herein, percent transmittance of light within the wavelength range of from 300 nm to 325 nm, or at a single wavelength of 310 nm, is used to predict the suitability of the sample for preparing polymerizates of low bubbling and Yellowness Index. Without being bound by theory, it is believed that minute impurities, undetectable by other standard methods, exhibit slight differences in refractive index versus the bulk sample, resulting in reduced percent transmittance over a selected portion of the ultraviolet spectrum. % T may be quantified in a variety of ways. In one example, a different optical system may be used. The choice of wavelength used to obtain a transmittance value can be varied to some extent to effectively distinguish aromatic polyiso(thio)cyanate material that, when polymerized as described herein, can produce polyurethane and polythiourethane polymer compositions and optical articles with low bubbling and yellowing. A sample of an aromatic polyiso(thio)cyanate material having at least 35 percent transmittance (% T), measured at a wavelength of 310 nm with an optical path of one centimeter through a quartz cuvette calibrated to water having a unit % T of 100% can be identified by any equivalent measure of transmittance or absorbance.

Due to the nature of the impurities found in degraded aromatic polyiso(thio)cyanates and the physics of transmittance and absorbance, aromatic polyiso(thio)cyanates other than mXDI are expected to alter transmittance at approximately the same wavelength range as mXDI. Non-limiting examples of impurities may include urea and biuret products formed when polyiso(thio)cyanates are exposed to moisture.

For the methods herein, percent transmittance (% T), or any other optical property that can be used to measure spectral properties such as absorbance of light, at any wavelength from 300 nm to 325 nm, such as 310 nm, 311 nm, 312 nm, 313 nm, 314 nm, or 315 nm, may be measured, or for any range within the range of 300 nm to 325 nm, such as from 300 nm to 400 nm, from 300 nm to 375 nm, from 300 nm to 350 nm, from 300 nm to 325 nm, or from 305 nm to 315 nm, or for a sub-range of any of the preceding, such as, for example and without limitation, from 305 nm to 320 nm, from 306 nm to 318 nm, may be used to effectively distinguish aromatic polyiso(thio)cyanate materials that produce polyurethane and polythiourethane polymer compositions and high refractive index (e.g., η>1.6) optical articles with low Yellowness Index and/or bubbling from aromatic polyiso(thio)cyanate materials that may be polymerized to produce polyurethane and polythiourethane polymer compositions and high refractive index optical articles with unacceptably-high Yellowness Index or bubbling.

A "light source" emits light in any stated spectrum, and may be coherent (e.g., laser) or incoherent (e.g., a lamp). For purposes herein, the light source emits within the ultraviolet (UV) range of from 300 nm to 325 nm, but can produce a broader or narrower spectrum. A broad-spectrum light source may be used, covering, for example, a large portion of the visible range of light along with suitable UV emissions for the methods described herein. A typical spectrophotometer may be used to measure transmission or absorbance spectra for the methods described herein, and can be configured to measure at a single wavelength or over a range of wavelengths.

The present invention is more particularly described in the following examples, which are intended to be illustrative only, since numerous modifications and variations therein will be apparent to those skilled in the art. Unless otherwise specified, all parts and all percentages are by weight.

Examples

Measurement of Percent Transmittance (% T) of mXDI

Samples of m-xylylene diisocyanate (mXDI) were evaluated for percent transmittance at 310 nm and 320 nm according to the following procedure. Baseline-corrected percent transmittance measurements were made with a Cary 300 UV-Vis Spectrophotometer. Ultraviolet-Visible (UV-Vis) percent transmittance values were obtained over the wavelength range of 800-200 nm at a wavelength accuracy of +/−0.2 nm. Spectral bandwidth and the wavelength axis data point spacing were set at 2.0 nm and 1.0 nm, respectively. A pair of matched 1 cm path-length UV-grade quartz cuvettes were used for the analysis. One cuvette was filled with isocyanate monomer and placed in the sample beam position, and the second was filled with deionized water and placed in the reference beam position of the instrument. Percent transmittance of each sample was recorded at 310 nm and 320 nm, as recorded in Table 1.

TABLE 1

% Transmittance of mXDI samples

| mXDI | % T at 310 nm | % T at 320 nm |
|---|---|---|
| Sample A | 55.6 | 78.2 |
| Sample B | 54.1 | 78.7 |
| Sample C | 36.7 | 63.0 |
| Sample D | 27.8 | 58.7 |
| Sample E | 26.3 | 55.9 |
| Sample F | 15.1 | 41.6 |

FIG. 1 provides a graph showing the relationship between % T for each of the mXDI batches tested, versus wavelength. This graph illustrates that the % T at 310 nm or between 305 and 320 nm, such as at 311 nm, 312 nm, 313 nm, 314 nm, 315 nm, 316 nm, 317 nm, 318 nm, 319 nm, or 320 nm can be used to discriminate batches of aromatic polyiso(thio)cyanates, such as mXDI, able to produce acceptable Yellowness Index and bubbling.

Casting Procedure

Each of sample A thru F were formulated into 5 kg batches according to the following general casting procedure to give cast articles of Examples 1 through 6.

TABLE 2

| Cast Example | mXDI Sample |
|---|---|
| Example 1 | Sample A |
| Example 2 | Sample B |
| Example 3 | Sample C |
| Example 4 | Sample D |
| Example 5 | Sample E |
| Example 6 | Sample F |

First, according to Table 2, the indicated m-xylylene diisocyanate (mXDI, 52 parts by weight), dimethyltin dichloride (110 ppm on total batch) and ZELEC® UN (a mold release agent available from Stepan Company; 1200 ppm on total batch) were charged into a 10 L reactor set at 18° C. The contents were mixed for 30 min under vacuum (<15 torr). The vacuum was released and 2,3-bis((2-mercaptoethyl)thio)-1-propanethiol (42 parts by weight, with a water content of 650±100 ppm) was introduced and the resulting homogenous solution was mixed at 140 rpm under vacuum (<15 torr) for 1 h. The vacuum was released and nitrogen was introduced. Mixing at 40 rpm was continued for 2.5 h. The resulting solution was filtered through 5 μm Polycap™ HD filtration capsule and injected into a glass mold secured with tape. The glass mold was configured to produce a Base 5 plano lens with 85 mm diameter and 8 mm thickness at the center. The mold was put into an oven and gradually heated from 15° C. to 120° C. over a period of about 16 hours, then held at 120° C. for a time sufficient to complete the polymerization reaction, normally at least four hours. After completion of polymerization, the mold was removed from the oven and the cast lens was released from the mold. A total of 55 lenses were molded for each of Examples 1 through 6.

Results

A random sample of 10 lenses of each example composition were measured for Yellowness Index by a Hunter UltraScan® Pro Instrument, purchased from Hunter Associates Laboratory, Inc. Yellowness Index was obtained by using EasyMatchQC software. Measurements were confirmed by the following equation:

$$YI\ E313 = 100(C_xX - C_zZ)/Y$$

Where $C_x$ is a standard coefficient of 1.3013 for D65/10° C. and $C_z$ is a standard coefficient of 1.1498 for D65/10° C. The X, Y and Z were the output values associated with each sample. Results, as an average of 10 representative samples, are shown in Table 3.

All 55 cast lenses for each cast composition were visually inspected for bubbles. Any bubbles present and visible to the naked eye in the lens were then measured from the outer edge of the lens. Any bubble housed within 3 mm of the outer edge of the lens was deemed acceptable, any bubble found further than 3 mm into the lens measured from the outer edge was considered a center bubble and failed inspection. A lens that had no visible bubbles beyond the 3 mm edge area was considered a PASS, even if bubbles existed along the 3 mm edge. Results of the center bubble test are shown in Table 3.

TABLE 3

Evaluation of cast compositions by Yellowness Index and bubbles.

| Samples of mXDI with varying % T | Lens YI (E313) | % PASS Center Bubbles |
|---|---|---|
| Example 1 | 1.78 | 100 |
| Example 2 | 1.73 | 100 |
| Example 3 | 1.88 | 100 |
| Example 4 | 1.85 | 100 |
| Example 5 | 1.96 | 7 |
| Example 6 | 2.09 | 0 |

Figure 2:
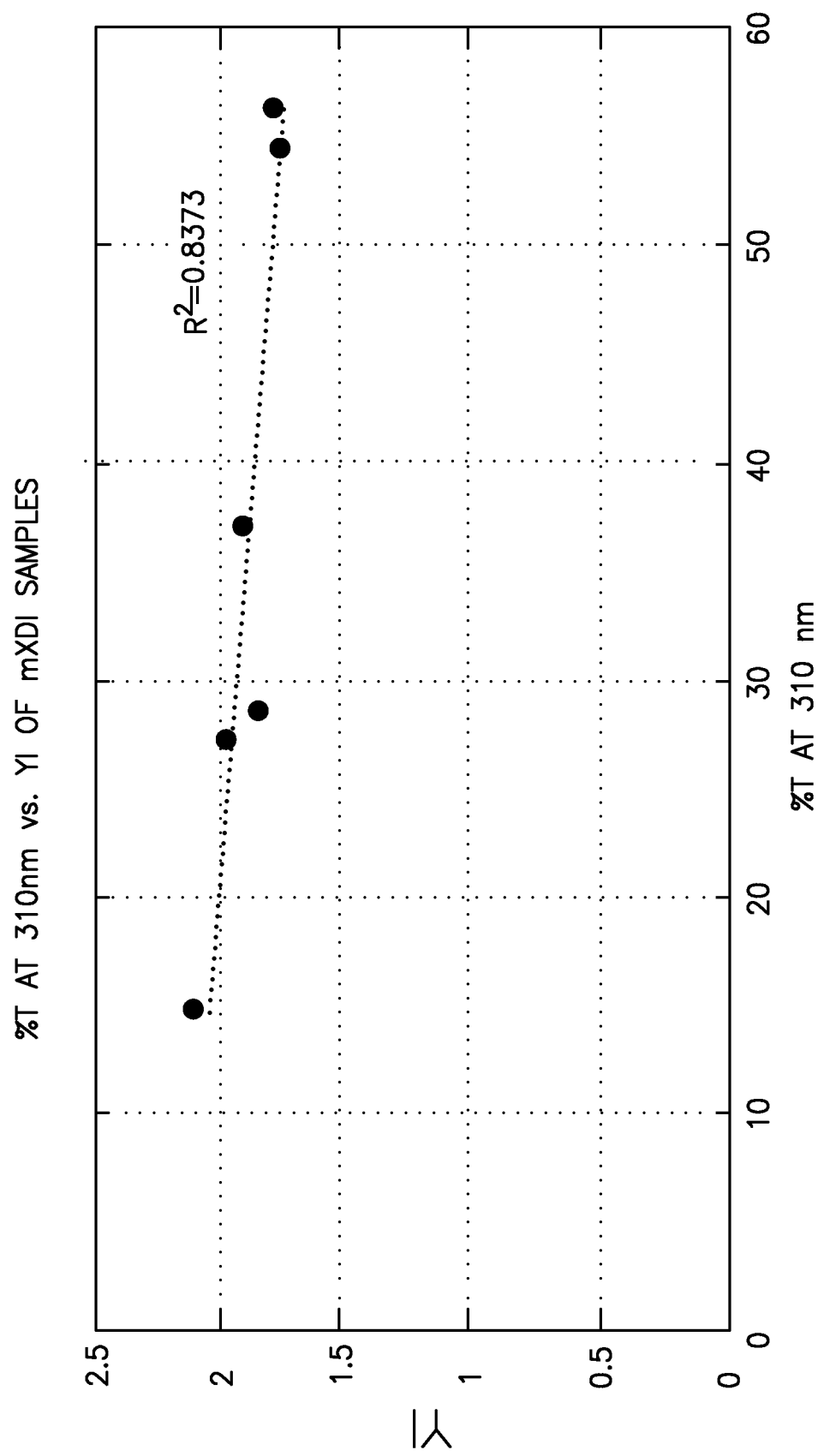
FIG. 2: Graph depicting Yellowness Index of polymerizates vs. percent transmittance (% T) at 310 nm for mXDI samples as described in the Example.

FIG. 2 provides a graph depicting the relationship between Yellowness Index and % T for the mXDI batches tested, illustrating that increased % T of the mXDI (e.g., at least 35% T at 310 nm and/or at least 60% T at 320 nm) correlates with acceptable Yellowness Index.

All documents, such as but not limited to issued patents and patent applications, referred to herein, and unless otherwise indicated, are to be considered to be "incorporated by reference" in their entirety.

The embodiments have been described with reference to various examples. Modifications and alterations will occur to others upon reading and understanding the foregoing examples. Accordingly, the foregoing examples are not to be construed as limiting the disclosure.

The invention claimed is:

1. A method of preparing a polymer composition, comprising polymerizing a polymerizable composition comprising a mixture of an aromatic polyiso (thio) cyanate material and at least one polyol or a polythiol, wherein percent transmittance (% T) of the aromatic polyiso (thio) cyanate material used to prepare the polymerizable composition is measured at a wavelength of 310 nm±2 nm, and the aromatic polyiso (thio) cyanate material added to the mixture has at least 35 percent transmittance (% T), at least 40% T, or at least 50% T at a wavelength of 310 nm in a quartz cuvette with an optical path of one centimeter, calibrated to water having a unit % T of 100%, and optionally at least 60% T at a wavelength of 320 nm in a quartz cuvette with an optical path of one centimeter, calibrated to water having a unit % T of 100%, and measured at a wavelength of 320 nm±2 nm.

2. The method of claim 1, wherein the aromatic polyiso (thio) cyanate is an aromatic diisocyanate.

3. The method of claim 2, wherein the aromatic polyiso (thio) cyanate is m-xylylene diisocyanate.

4. The method of claim 1, wherein the polyol or polythiol is selected from 4-mercaptomethyl-3,6-dithia-1,8-octanedithiol, 1,5-dimercapto-3-thiapentane, 2,3-bis((2-((2-mercaptoethyl) thio) ethyl) thio) propan-1-ol, 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1, 11-dimercapto-3,6,9-trithiaundecane, or mixtures of two or more thereof.

5. The method of claim 1, further comprising prior to polymerizing the polymerizable composition, injecting the polymerizable composition into a mold to form an optical article.

6. The method of claim 5, wherein the optical article is an ophthalmic article.

7. The method of claim 6, wherein the ophthalmic article is a lens or an eyeglass lens.

8. The method of claim 1, further comprising, prior to polymerizing the polymerizable composition:
   determining the percent transmittance of one or more batches of the polyiso (thio) cyanate material at 310 nm±2 nm;
   selecting a batch of the aromatic polyiso (thio) cyanate material having at least 35 percent transmittance (% T) at a wavelength of 310 nm in a quartz cuvette with an optical path of one centimeter, calibrated to water having a unit % T of 100%; and
   combining aromatic polyiso (thio) cyanate material from the selected batch with the polythiol to produce the polymerizable composition.

9. The method of claim 8, wherein determining the percent transmittance of one or more batches of the polyiso (thio) cyanate material is performed by:
   illuminating a liquid sample of a batch of the aromatic polyiso (thio) cyanate material with a light source including light at a wavelength of 310 nm±2 nm; and measuring % T at 310 nm±2 nm.

10. A polymerizable composition for use in preparing a polymer composition comprising a mixture of an aromatic polyiso (thio) cyanate composition and a polyol or a polythiol compound, wherein the transmittance of the polyiso (thio) cyanate composition used to prepare the mixture is determined at a wavelength of 310 nm±2 nm, and the aromatic polyiso (thio) cyanate composition added to the polymerizable composition has at least 35 percent transmittance (% T), at least 40% T, or at least 50% T, at a wavelength of 310 nm in a quartz cuvette with an optical path of one centimeter, calibrated to water having a unit % T of 100%, and optionally at least 60% T at a wavelength of 320 nm in a quartz cuvette with an optical path of one centimeter, calibrated to water having a unit % T of 100%, and measured at a wavelength of 320 nm±2 nm.

11. The polymerizable composition of claim 10, wherein the aromatic polyiso (thio) cyanate is an aromatic diisocyanate.

12. The polymerizable composition of claim 10, wherein the aromatic polyiso (thio) cyanate is m-xylylene diisocyanate.

13. The polymerizable composition of claim 10, wherein the polyol or polythiol is:
   4-mercaptomethyl-3,6-dithia-1,8-octanedithiol;
   1,5-dimercapto-3-thiapentane;
   2,3-bis((2-((2-mercaptoethyl) thio) ethyl) thio) propan-1-ol; or
   a mixture of 5,7-dimercaptomethyl-1, 11-dimercapto-3,6,9-trithiaundecane, 4,7-dimercaptomethyl-1, 11-dimercapto-3,6,9-trithiaundecane, and 4,8-dimercaptomethyl-1, 11-dimercapto-3,6,9-trithiaundecane.

14. The polymerizable composition of claim 10, wherein determining the percent transmittance of one or more batches of the aromatic polyiso (thio) cyanate material is performed by:
   illuminating a liquid sample of a batch of the aromatic polyiso (thio) cyanate material with a light source including light at a wavelength of 310 nm±2 nm; and measuring % T at 310 nm±2 nm.

15. A method of manufacturing a molded article, comprising preparing a polymerizable composition according to claim 10; introducing the polymerizable composition into a mold; and curing, at least partially, the polymerizable composition within the mold.

16. A method of identifying a batch of an aromatic polyiso (thio) cyanate material for use in the production of an optical article comprising a polymerizate of reactants comprising the aromatic polyiso (thio) cyanate material and at least one polythiol and/or polyol, wherein the optical article has a refractive index greater than 1.6, the method comprising:
   illuminating a liquid sample of the batch of the aromatic polyiso (thio) cyanate material with a light source producing light at 310 nm±2 nm;
   measuring percent transmittance (% T) of the sample of the batch of the aromatic polyiso (thio) cyanate material at a wavelength of 310 nm in a quartz cuvette with an optical path of one centimeter, calibrated to water having a unit % T of 100%; and
   selecting the batch of the aromatic polyiso (thio) cyanate material for use in the production of an optical article if the measured % T is at least 35 percent.

17. The method of claim 16, further comprising:
   combining aromatic polyiso (thio) cyanate material from a selected batch and at least one polythiol and/or polyol to form a polymerizable composition comprising the aromatic polyiso (thio) cyanate material and the polythiol and/or polyol; and
   polymerizing the polymerizable composition.

18. The method of claim 17, further comprising introducing the polymerizable composition into an optical article mold before polymerizing the polymerizable composition.

19. The method of claim 18, wherein the optical article is a lens.

20. The method of claim 16, wherein the polyiso (thio) cyanate is m-xylylene diisocyanate.

21. The method of claim 17, wherein the polyol or polythiol is:
   4-mercaptomethyl-3,6-dithia-1,8-octanedithiol;
   1,5-dimercapto-3-thiapentane;
   2,3-bis((2-((2-mercaptoethyl) thio) ethyl) thio) propan-1-ol; or
   a mixture of 5,7-dimercaptomethyl-1, 11-dimercapto-3,6,9-trithiaundecane, 4,7-dimercaptomethyl-1, 11-dimercapto-3,6,9-trithiaundecane, and 4,8-dimercaptomethyl-1,11-dimercapto-3,6,9-trithiaundecane.

* * * * *